United States Patent [19]
Mehring et al.

[11] Patent Number: 5,606,687
[45] Date of Patent: Feb. 25, 1997

[54] METHOD AND APPARATUS FOR OPTIMIZING SUPERVISOR MODE STORE OPERATIONS IN A DATA CACHE

[75] Inventors: Peter A. Mehring, Sunnyvale; Herbert Lopez-Aguado, Mountain View, both of Calif.

[73] Assignee: Sun Microsystems, Inc., Mountain View, Calif.

[21] Appl. No.: 132,795

[22] Filed: Oct. 7, 1993

[51] Int. Cl.$^6$ .................................................. G06F 12/08
[52] U.S. Cl. .......................................... 395/466; 395/445
[58] Field of Search ................................. 395/425, 466, 395/445, 465

[56] References Cited

U.S. PATENT DOCUMENTS

| | | | |
|---|---|---|---|
| 5,091,846 | 2/1992 | Sachs et al. | 395/250 |
| 5,371,872 | 12/1994 | Larsen et al. | 395/445 |
| 5,491,799 | 2/1996 | Kreuzenztein et al. | 395/200.08 |

*Primary Examiner*—Eddie P. Chan
*Assistant Examiner*—Kevin L. Ellis
*Attorney, Agent, or Firm*—Blakely Sokoloff Taylor & Zafman LLP

[57] ABSTRACT

A system and method for performing conditionally cache allocate operations to a data cache in a computer system. As supervisor mode operations typically do not experience data locality of accesses frequently found in user mode operations, it has been determined that performance benefits can be achieved by inhibiting cache allocate operations during supervisor mode. When a write miss to the cache occurs, the memory management unit checks the state of the processor status register to determine the mode of the processor. If the processor status register indicates that the processor is in supervisor mode, the memory management unit issues a signal to the data cache controller that the data is non-cacheable. When the data cache controller receives a non-cacheable signal, the cache allocate process is not performed. The non-cacheable signal is issued by the memory management unit while the processor is in supervisor mode regardless of the state of the cacheable status bit associated with the memory. Thus, if the processor is not in supervisor mode, the memory management unit will issue a non-cacheable signal to the data cache controller based upon the state of the cacheable status bit associated with the memory. This status bit is typically found in the corresponding page table entry in the page table of a translation look aside buffer. Therefore, although a supervisor mode operation inhibits a cache allocate operation, subsequent non-supervisor mode operations to the same data will proceed based upon the state of the cacheable status bit associated with the memory.

11 Claims, 3 Drawing Sheets

PTE Layout in TLB RAM

METHOD AND APPARATUS FOR OPTIMIZING SUPERVISOR MODE STORE OPERATIONS IN A DATA CACHE

BACKGROUND OF THE INVENTION

1. Field of the Invention

The present invention relates to the optimization of a cache allocate store strategy when stores are performed in the supervisor mode.

2. Art Background

In a computer system, the speed of computer operations may be restricted by the speed of memory accesses. To increase the speed of memory accesses, caches were developed. A cache is a high-speed memory that stores a portion of the main memory that is being accessed by the computer system. Caches take advantage of the fact that accesses to memory experience locality, that is, accesses occur to memory to repetitive addresses or addresses that are local, that is, for example, within the same page. Thus, by copying certain portions of memory accessed into this cache, there is a likelihood that subsequent accesses to main memory will be found already stored in the cache for quick access.

A number of techniques are used for maintaining the cache and updating the cache and the memory to be consistent to one another. These various techniques are well known in the art, see for example, John L. Hennessey and David A. Patterson, Computer Architecture - A Quantitative Approach (Morgan Kaufmann Publishers Inc. 1990), pages 408–425.

There are typically two policies that exist for write operations to the cache. One is the write through policy (also referred to as store through), wherein the information to be written is written to both a block of the cache and the block of the memory, and the write back policy (also referred to as copy back or store in), in which the information is written all into the block in the cache and the modified cache block is written to main memory only when that cache block is replaced from the cache. Both techniques have their advantages. Using the write through policy, main memory is identified to have the most current copy of the data. This is quite important for cache consistency. Furthermore, it is also the easier of the two policies to implement. However, the CPU must wait for the write operations to complete during write throughs, resulting in a CPU write stall. One optimization to reduce write stall is a write buffer, which allows the processor to continue while the memory is being updated. As the data is stored in the write buffer, the operation to the cache is performed by accessing the data from the write buffer, eliminating the need for the CPU to wait until the write to the cache is complete.

If a miss occurs on a write operation, there are typically two options or techniques to perform. In the write allocate technique (also referred to as fetch on write), the block of data is loaded into the main memory and subsequently loaded into the cache. In a no write allocate system, the block is modified in the memory and not loaded into the cache. The write allocate process is desirable for cache consistency purposes. Furthermore, taking into consideration locality, there is a strong likelihood that that same memory will be subsequently accessed. Therefore, the time penalty incurred in updating the memory and the data cache is well offset by the time savings achieved when subsequently accessing the data cache for the same or local data.

Data locality, however, is not a common occurrence when the write operations are performed while in supervisor mode. These write operations typically include operating system, or kernel type operations, such as initializing a page in memory. Supervisor subroutines to perform certain supervisor operations may include supervisor instructions or user instructions. By their nature, these type of operations, performed while in supervisor mode, do not require or indicate that a subsequent read would be performed in a timely manner to make the time penalty paid for updating the cache worth the expense. Although pages can be marked as non-cacheable so that the load to the cache is not performed on a store operation, these pages are frequently accessed by not only the supervisor, but by the user. For user access, it is desirable these pages are cacheable such that time savings are achieved, due to the locality of data accesses during user operations.

SUMMARY OF THE INVENTION

The system and method of the present invention provides a simple technique for implementing a conditional cache allocate store policy that inhibits cache allocates to be performed on operations performed in the supervisor mode while permitting cache allocate policy to be engaged during non-supervisor mode store operations. The system is implemented with little overhead and modification to the data cache and controller, which performs the stores to the cache.

The system of the present consists of a memory hierarchy of main memory and a data cache for storing data cache lines of memory, and a memory management unit (MMU) which controls the operation of memory operations in the memory hierarchy. The MMU issues signals to the data cache controller to indicate if the data is to be stored in the cache. In particular, the MMU performs the necessary address translations and sends the address and data to the controller for storage in the cache. Among the signals sent to the data controller is a cacheable signal indicating whether the data is actually cacheable. Typically, the signal is generated in accordance with the state of the cacheable bit found in each page table entry located in the translation look aside buffer in the MMU.

In the system of the present invention, the MMU further looks to the state of the processor state register (PSR) in the processor. This register indicates whether the store operation performed while the processor is in supervisor mode. If the store is performed while in supervisor mode, the MMU will issue a cacheable signal indicating that the data is not cacheable regardless of the state of the cacheable bit. If the data cache controller receives a signal indicating the data is not cacheable, the load operation to the cache will not be performed, thereby saving the time required to perform the load. As the operation does not affect the state of the cacheable bit in the TLB, subsequent operations to the data, particularly user operations, will not be affected. It has been found that by eliminating cache allocate operations with regard to supervisor stores, that a 20% performance improvement is achieved for certain kernel subroutines.

BRIEF DESCRIPTION OF THE DRAWINGS

The objects, features and advantages of the present invention will be apparent to one skilled in the art from the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
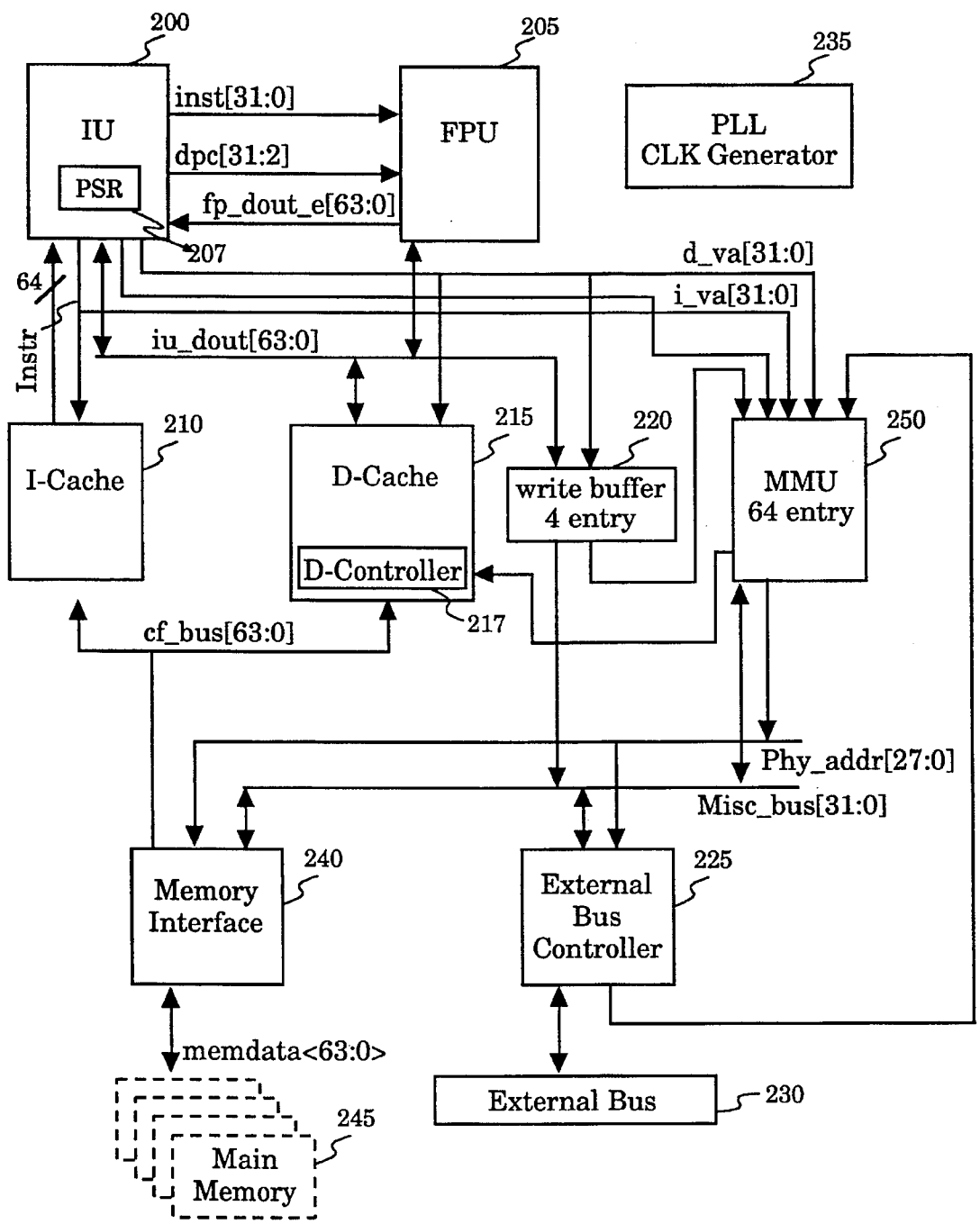
FIG. 1 is a block diagram illustration of the system of the present invention.

The system and method of the present invention provides for a conditional cache allocate write policy which inhibits cache allocate operations on a store miss when the write operations are initiated while in supervisor mode. An exemplary system, which performs the conditional cache allocate process of the present invention, is shown in FIG. 1. This system is exemplary and it is readily apparent that other types of systems, which include a data cache and main memory hierarchy, may be used. Referring to FIG. 1, the system includes a number of elements, particularly an instruction unit (IU) 200, floating point unit (FPU) 205, a clock generator 235, an instruction cache 210, a data cache 215, a write buffer 220, a memory management unit (MMU) 250, an external bus controller 225, which is coupled to an external bus 230, and a memory interface 240, which is coupled to main memory 245.

The MMU 250 receives memory access instruction and data addresses from the IU 200 and FPU 205 and controls the memory hierarchy, particularly the instruction cache 210, data cache 215, memory interface 240 and main memory 245. In particular, the MMU 250 establishes conditional cache allocate operations that inhibit a cache allocate operation from being performed when the instruction received from the processor 200 while in supervisor mode.

The MMU 250 includes a tag memory 253, preferably a TLB (translation look aside buffer) which contains page table entries used to perform virtual to physical address translations and to determine whether data requested is found in the cache 215. The page table entries also identify whether the corresponding page of memory is cacheable by the state of the cacheable status bit.

If a store miss occurs to the data cache during a store operation, the MMU 250 determines whether the processor is in supervisor mode and issues a signal to the data cache controller 217 to indicate that the data subject of the operation is noncacheable, regardless of the state of the cacheable bit associated with the memory. The MMU 250 determines the mode of the processor based upon the state of the processor state register 207. The cacheable signal is checked by the data cache controller for each data cache miss. If the processor state register 207 is set to indicate that the processor is not in supervisor mode, the MMU will issue a cacheable/non-cacheable signal based on the state of the cacheable bit for the memory.

Upon receipt of a signal indicating that the data is non-cacheable, the data cache controller 217 preferably causes the data cache 215 to enter into an idle state and perform a different write policy, for example, write invalidate, instead of performing a cache line fill pursuant to a cache write allocate policy. Therefore, the supervisor stores which typically do not experience locality in accesses do not cause as detrimental an effect on latency due to the elimination of the cache line fill from memory into the data cache 215. However, if those same lines are subsequently referenced while in user mode, so long as the cacheable bit in the tag memory is set to be cacheable, this memory can be subsequently cached and accessed.

Figure 2:
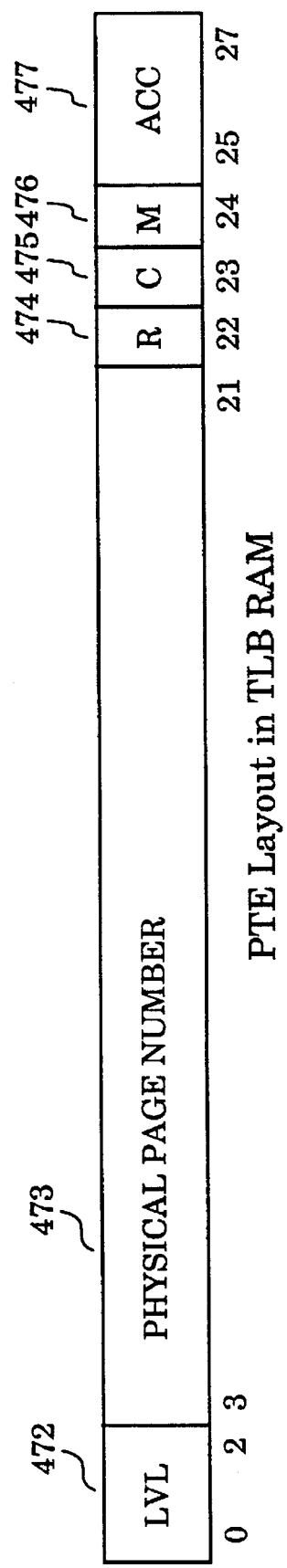
FIG. 2 is a block diagram illustration of the exemplary page table entry located in the MMU.

An exemplary page table entry, showing the cacheable bit for a page is illustrated by FIG. 2. The typical PTE entry includes level bits 472, physical page number 473, reserve bit 474, cacheable bit 475, modified bit 476, access/permission bits 477. Thus the MMU, when the processor is operating in supervisor mode, will inhibit cache line fills by issuing a non-cacheable signal to the data cache controller, regardless of the state of the cacheable bit 475. However, subsequent accesses that may be performed while in user mode will execute write allocate sequences if the cacheable bit is set. As the prior supervisor mode execution does not modify or change the state of the cacheable bit 475, if the data was originally cacheable subsequent to the supervisor access, the data is again cacheable.

Figure 3:
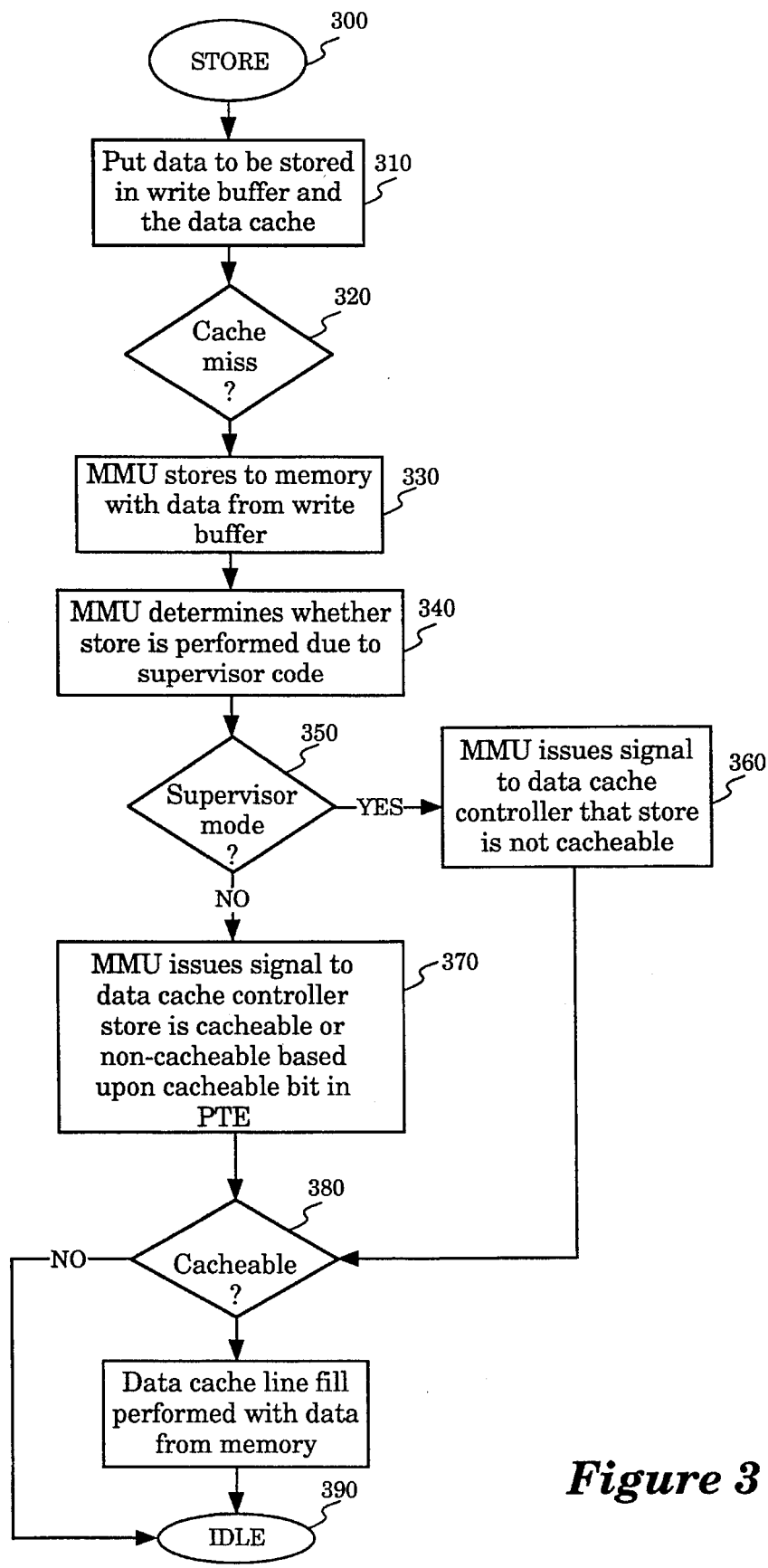
FIG. 3 is a flow diagram illustrating the method of the present invention.

The process performed may best be described with reference to FIG. 3. If a store operation is to be performed, step 300, the data to be stored is placed in the write buffer and the data cache, step 310. When the data cache tag compare misses for the store, step 320, the MMU translates the virtual address, checks the cacheable bit, signals the data cache controller the cacheable status, and stores the data to be written to memory with the data from the write buffer, step 330. It is readily apparent that although the preferred embodiment utilizes a configuration that employs a write buffer, other structures which do not include a write buffer may be used.

At step 340, the MMU determines whether the store operation is to be performed due to instructions in supervisor mode. If the store is due to supervisor mode instructions, step 350, the MMU issues a signal to the data cache controller that the data stored is not cacheable, step 360. If the store is not due to supervisor mode instructions, then at step 370, the MMU issues a signal to the data cache controller based on the cacheable bit from the corresponding PTE. If the store is cacheable, step 380, the data cache line fill is performed to the data cache with the data that was stored to main memory. If the data is not cacheable, as indicated by the control signal issued by the MMU, and the data cache is not filled, and the data cache controller enters the idle state, step 390.

Test systems that implement the conditional write allocate have found performance benefits of up to 20% for certain key kernel subroutines. Thus, advantage is take of the fact that supervisor code stores do not experience locality and therefore the time advantage gained by writing to the data cache is offset by the character of supervisor write operations. However, based on the cache bit in the MMU tag memory, subsequent accesses by user code are enabled such that the benefits of using a cache are realized.

The invention has been described in conjunction with the preferred embodiment. It is evident that numerous alternatives, modifications, variations and uses will be apparent to those skilled in the art in light of the foregoing description.

What is claimed is:

1. In a computer system comprising a processor and memory hierarchy, said memory hierarchy including a main memory and a data cache, said processor executing code including memory operations while in one of a plurality of modes, said modes including a supervisor mode, an apparatus for performing conditional cache allocate operations on data when a cache miss on a store operation occurs, said apparatus comprising:

cacheable status indicative of whether the data is cacheable;

mode status indicative of whether the operation is being performed while the processor is in supervisor mode;

a data cache controller for controlling read and write operations to the cache, aid data cache controller receiving a cacheable signal by which data is identified to be cacheable and non-cacheable, said data cache controller performing a cache allocate operation if the data is cacheable;

a memory management unit coupled to receive a memory address on which to perform the memory operation, wherein if a store miss occurs, said memory management unit checks the state of the mode status to determine whether the operation is being performed while in supervisor mode, said memory management unit sue a cacheable signal to the data cache controller indicating that the data is non-cacheable if the memory management unit determines that the processor is in supervisor mode, if the mode status indicates that the processor is not in supervisor mode, said memory management unit issues a cacheable signal to the data cache controller indicating that the data is non-cacheable if the cacheable status indicates that the data is non-cacheable and issues a cacheable signal indicating that the data is cacheable if the cacheable status indicates that the data is cacheable;

wherein cache allocate operations are eliminated while the processor in supervisor mode.

2. The apparatus as set forth in claim 1, wherein said memory management unit stores-the cacheable status.

3. The apparatus as set forth in claim 1 wherein the mode status is stored in a processor status register located in the processor, said memory management unit performing a read of the processor status register to determine whether the processor is in supervisor mode.

4. The apparatus as set forth in claim 1, wherein said memory management unit further comprises a translation look aside buffer comprising a page table, said page table comprising page table entries, each page table entry including a bit identifying the cacheable status indicative of whether data corresponding to the page table entry is cacheable.

5. In a computer system comprising a processor and memory hierarchy, said memory hierarchy including a main memory and a data cache, said processor executing code including memory operations while in one of a plurality of modes, said modes including a supervisor mode, an apparatus for performing conditional cache allocate operations on data when a cache miss on a store operation occurs, said apparatus comprising:

a processor status register located in the processor, said processor status register storing status information indicative of whether the operation is being performed while the processor is in supervisor mode;

a data cache controller for controlling read and write operations to the cache, said data cache controller receiving a cacheable signal by which data is identified to be cacheable and non-cacheable, said data cache controller performing a cache allocate operation if the data is cacheable;

a memory management unit coupled to receive a memory address on which to perform the memory operation, said memory management unit comprising;

a translation look aside buffer comprising a page table, said page table including page table entries identified according to a corresponding memory address, each page table entry comprising a cacheable status bit indicative of whether the corresponding page of memory is cacheable, mode status determination mechanism to read the processor status register when a store miss occurs, signal generator for generating the cacheable signal to the data cache controller, said signal generator issuing a cacheable signal indicating that the data is non-cacheable if the mode status determination mechanism determines that the processor is in supervisor mode, if it is determined that the processor is not in supervisor mode, said memory management unit issuing a cacheable signal to the data cache controller indicating that the data is non-cacheable if the cacheable status bit in the corresponding page table entry indicates that the data is non-cacheable and issuing a cacheable signal indicating that the data is cacheable if the cacheable status bit indicates that the data is cacheable;

wherein cache allocate operations are eliminated while the processor in supervisor mode.

6. In a computer system comprising a processor and memory hierarchy, said memory hierarchy including a main memory and a data cache, said processor executing code including memory operations while in one of a plurality of modes, said modes including a supervisor mode, a method for performing conditional cache allocate operations on data when a cache miss on a store operation occurs, said method comprising the steps of:

storing cacheable status indicative of whether data is cacheable;

storing mode status indicative of whether the operation is being performed while the processor is in supervisor mode;

if a miss to the data cache occurs during a store operation;
checking the mode status indicative of whether the operation is being performed while the processor is in supervisor mode,
if the processor is in supervisor mode, issuing a cacheable signal indicating that the data is not cacheable, and
if the processor is not in supervisor mode,
checking the cacheable status to determine whether the data is cacheable,
if the data is cacheable, issuing a cacheable signal indicating that the data is cacheable, and
if the data is not cacheable, issuing a cacheable signal indicating that the data is not cacheable; and
performing a write allocate operation if the data is cacheable;

wherein cache allocate operations are eliminated while the processor in supervisor mode.

7. The method as set forth in claim 6, wherein said step of storing cacheable status comprises the step of generating page table entries in a page table in a translation look aside buffer, each page table entry corresponding to a page of memory and includes a status bit indicative of whether the page is cacheable.

8. The method as set forth in claim 6, wherein said step of storing mode status comprises the step of providing a processor status register in the processor, said processor status register containing identification of the mode.

9. The method as set forth in claim 8, wherein said step of checking the mode status comprises the step of reading the processor status register.

10. The method as set forth in claim 6, wherein the steps of issuing a cacheable signal issues the signal to a data cache controller which controls operations to the cache, including a cache allocate operation.

11. The method as set forth in claim 7, wherein the step of checking the cacheable status comprises the step of locating the corresponding page table entry and reading the cacheable status bit indicative of whether the page is cacheable.

* * * * *